US012722115B2

(12) United States Patent
Balfe et al.

(10) Patent No.: US 12,722,115 B2
(45) Date of Patent: Sep. 1, 2026

(54) ONCE THROUGH $CO_2$ ABSORBER WITH INTEGRATED AMMONIA SLIP MITIGATION AND INTERCOOLING

(71) Applicant: Nuovo Pignone Tecnologie—S.r.l., Florence (IT)

(72) Inventors: Michael Balfe, Mainz (DE); Giulia Chiavaroli, Chieti (IT)

(73) Assignee: NUOVO PIGNONE TECNOLOGIE—S.R.L., Florence (IT)

( * ) Notice: Subject to any disclaimer, the term of this patent is extended or adjusted under 35 U.S.C. 154(b) by 302 days.

(21) Appl. No.: 18/508,763

(22) Filed: Nov. 14, 2023

(65) Prior Publication Data

US 2025/0153094 A1 May 15, 2025

(51) Int. Cl.
*B01D 53/14* (2006.01)
*B01D 53/18* (2006.01)
*B01D 53/78* (2006.01)

(52) U.S. Cl.
CPC ..... *B01D 53/1475* (2013.01); *B01D 53/1406* (2013.01); *B01D 53/1425* (2013.01);
(Continued)

(58) Field of Classification Search
CPC ............ B01D 53/1475; B01D 53/1406; B01D 53/1425; B01D 53/1493; B01D 53/185;
(Continued)

(56) References Cited

U.S. PATENT DOCUMENTS 2,043,109 A * 6/1936 McKee .................. C01B 32/50 423/232
2,355,588 A * 8/1944 Brandt .................... C10G 5/04 208/341

(Continued)

FOREIGN PATENT DOCUMENTS

EP 2564915 A1 3/2013
KR 20100072359 A * 6/2010 ......... B01D 53/1475
WO 2012112336 A1 8/2012

OTHER PUBLICATIONS

International Search Report and Written Opinion for International Application No. PCT/EP2024/025319, International Filing Date Nov. 8, 2024, Date of Mailing Mar. 24, 2025, 14 pages.

*Primary Examiner* — Dung H Bui
(74) *Attorney, Agent, or Firm* — CANTOR COLBURN LLP

(57) ABSTRACT

A process of removing $CO_2$ includes: contacting, in a first absorber stage, a $CO_2$-containing gas stream with a solution mixture to generate a partially cleaned gas stream; contacting, in a second absorber stage, the partially cleaned gas stream with a $CO_2$-lean solution to generate a further cleaned gas stream that contains ammonia and a $CO_2$-partially-enriched solution; dividing the $CO_2$-partially-enriched solution into a first portion and a second portion; removing the first portion of the $CO_2$-partially-enriched solution from the second absorber stage; chilling the removed $CO_2$-partially-enriched solution; contacting, in the third absorber stage, the chilled $CO_2$-partially-enriched solu-
(Continued)

tion with the further cleaned gas stream that contains ammonia to generate a treated gas stream and a $CO_2$-partially-enriched-solution containing recovered ammonia; and combining the solution containing the recovered ammonia removed from the third absorber stage with the second portion of the $CO_2$-partially-enriched solution, forming the solution mixture used in the first absorber stage.

20 Claims, 2 Drawing Sheets

(52) U.S. Cl.
CPC ....... *B01D 53/1493* (2013.01); *B01D 53/185* (2013.01); *B01D 53/78* (2013.01); *B01D 2252/102* (2013.01); *B01D 2252/103* (2013.01); *B01D 2252/204* (2013.01); *B01D 2257/504* (2013.01); *B01D 2258/0283* (2013.01)

(58) Field of Classification Search
CPC .............. B01D 53/78; B01D 2252/102; B01D 2252/103; B01D 2252/204; B01D 2257/504; B01D 2258/0283; B01D 2251/2062; B01D 2252/10; B01D 53/18; B01D 53/62
See application file for complete search history.

(56) References Cited

U.S. PATENT DOCUMENTS 2,878,099 A * 3/1959 Spolders .................. C10K 1/10 423/220
3,847,570 A * 11/1974 Gunther ............. B01D 53/1481 95/163
3,947,258 A * 3/1976 Decker .................... B01D 1/00 62/47.1
9,034,081 B2 * 5/2015 Johnson ................... B01D 8/00 95/236
9,084,959 B2 * 7/2015 Nakagawa .............. C01B 32/50
11,512,402 B2 * 11/2022 Bairamijamal ......... C07C 41/01
2003/0045756 A1 * 3/2003 Mimura ............. B01D 53/1475 564/498
2009/0101012 A1 * 4/2009 Gal ........................ B01D 53/62 55/342
2009/0101021 A1 4/2009 Tonelli et al.
2011/0061533 A1 3/2011 Black et al.
2011/0120308 A1 5/2011 Dube et al.
2011/0135550 A1 * 6/2011 Nagayasu .......... B01D 53/1406 422/178
2011/0158891 A1 * 6/2011 Nagayasu .......... B01D 53/1475 423/437.1
2013/0175004 A1 * 7/2013 Dube ....................... F23J 15/04 165/104.11
2014/0013945 A1 * 1/2014 Tanaka .................... C01B 32/50 95/186
2014/0017622 A1 * 1/2014 Chen .................. B01D 19/0005 432/29
2014/0241967 A1 * 8/2014 Fujita ................. B01D 53/1412 95/13
2020/0407221 A1 * 12/2020 Gubrinski .......... B01D 53/1425
2023/0033705 A1 * 2/2023 Gao ....................... B01D 53/62
2023/0191314 A1 * 6/2023 Tanaka .................... C01B 32/50 423/228
2023/0285891 A1 * 9/2023 Zheng .................... B01D 47/14
2023/0373801 A1 * 11/2023 Zhang .................... B01D 53/18
2023/0383678 A1 * 11/2023 Nam ..................... F01N 3/0857
2023/0405521 A1 * 12/2023 Zhang .................... B01D 53/96
2025/0153094 A1 * 5/2025 Balfe ................. B01D 53/1493

* cited by examiner

ONCE THROUGH $CO_2$ ABSORBER WITH INTEGRATED AMMONIA SLIP MITIGATION AND INTERCOOLING

BACKGROUND

Carbon dioxide is a primary driver of global climate change; therefore, it is critical to reduce its emissions. A mixed salt process (MSP) uses aqueous mixtures of potassium carbonate and ammonium salts as solvents and captures carbon dioxide ($CO_2$) from a gas stream by dissolving $CO_2$ in the solvent forming bicarbonate ions and/or carbonate ions. Thus the $CO_2$ capture efficiency can be affected by the liquid phase reaction rates. Unfortunately, many available processes have slow liquid phase reactions rates. To increase the $CO_2$ capture efficiency, some known $CO_2$ capture systems may require a larger packing volume and/or multiple pipes, pumps, and cooling devices for recirculation of solvents. This can lead to higher electrical consumption and increased operation cost. Accordingly, there is a continuing need for an energy efficient process and system for $CO_2$ capture.

SUMMARY

A process of removing $CO_2$ from a $CO_2$-containing gas stream includes: contacting, in a first absorber stage, a $CO_2$-containing gas stream with a solution mixture to generate a partially cleaned gas stream; contacting, in a second absorber stage, the partially cleaned gas stream with a $CO_2$-lean solution to generate a further cleaned gas stream that contains ammonia and a $CO_2$-partially-enriched solution; dividing the $CO_2$-partially-enriched solution into a first portion and a second portion; removing the first portion of the $CO_2$-partially-enriched solution from the second absorber stage; chilling the removed $CO_2$-partially-enriched solution; contacting, in the third absorber stage, the chilled $CO_2$-partially-enriched solution with the further cleaned gas stream that contains ammonia to generate a treated gas stream and a $CO_2$-partially-enriched-solution containing recovered ammonia; and combining the solution containing the recovered ammonia removed from the third absorber stage with the second portion of the $CO_2$-partially-enriched solution, forming the solution mixture used in the first absorber stage.

A $CO_2$ capture system includes: an absorber vessel comprising a first absorber stage, a second absorber stage, and a third absorber stage, the second absorber stage comprising a second gas-liquid contacting device and a second liquid collector for collecting a $CO_2$-partially-enriched solution which is a lean solution that has passed through the second gas-liquid contacting device; a gas inlet for introducing a $CO_2$-containing gas stream into the absorber vessel; a gas outlet for removing a treated gas stream from the absorber vessel; a liquid inlet for introducing the $CO_2$-lean solution into the second absorber stage; a liquid outlet for removing a $CO_2$-rich solution from the first absorber stage; a first liquid delivery path for delivering an ammonia mitigation solution, which is a first portion of the $CO_2$-partially-enriched solution collected on the second liquid collector that is above a first liquid distributor in the first absorber stage, to the third absorber stage; a chilling means for reducing the ammonia mitigation solution temperature before the ammonia mitigation solution is delivered to the third absorber stage; and a second liquid delivery path for delivering a solution containing recovered ammonia drawn from the third absorber stage to the second liquid collector in the second absorber stage or to the first absorber stage at a height location that is above a first gas-liquid contacting device in the first absorber stage so that the solution containing the recovered ammonia and a second portion of the $CO_2$-partially-enriched solution are mixed above or in the first gas-liquid contacting device.

BRIEF DESCRIPTION OF THE DRAWINGS

The following descriptions should not be considered limiting in any way. With reference to the accompanying drawings, like elements are numbered alike.

DETAILED DESCRIPTION

The inventors hereof have discovered an efficient process and system for removing $CO_2$ from a $CO_2$-containing gas. The system and process described herein can increase $CO_2$ removal efficiency and/or decrease the required packing volume and/or reduce required steam consumption while simultaneously mitigating ammonia emission.

In the system and process described herein, the $CO_2$-lean solution introduced into the absorber is not diluted with another solution so that the $CO_2$ capture driving force can be maximized. In addition, the $CO_2$-lean solution can be allowed to have a relatively high feed temperature which allows higher operating temperatures in the absorber with the purpose to improve the $CO_2$ dissolution mass transfer through improved liquid phase reaction kinetics.

Furthermore, a $CO_2$-partially-enriched solution is used to mitigate ammonia loss. Unlike a solution with a higher $CO_2$ loading, using a $CO_2$-partially-enriched solution for ammonia slip abatement allows the solution to be cooled/chilled without the problems of ammonium bicarbonate precipitation. Thus the process and system can achieve a significant reduction in ammonia slip.

Moreover, the $CO_2$-partially-enriched solution with the recovered ammonia is returned to a height location in the absorber close to a height location from which it is drawn, which can minimize the disruption of the compositional driving forces and associated potential to capture $CO_2$. The portion of relatively cool $CO_2$-partially-enriched solution with the recovered ammonia can also effectively cool the relatively warm $CO_2$-partially-enriched solution upon reintroduction and mixing in the absorber, which saves equipment, otherwise required for separate intercooling, by functional integration. In other words, the process and system can reduce ammonia emission by adding once through extraction of a $CO_2$-partially-enriched solution and return of the solution after ammonia recovery while simultaneously acting as an effective method for solvent intercooling. The process and system can also minimize the associated absorber packing and avoid recirculation of solutions, which leads to further cost energy savings.

A detailed description of one or more embodiments of the disclosed process and system are presented herein by way of exemplification and not limitation with reference to the Figures.

Figure 1:
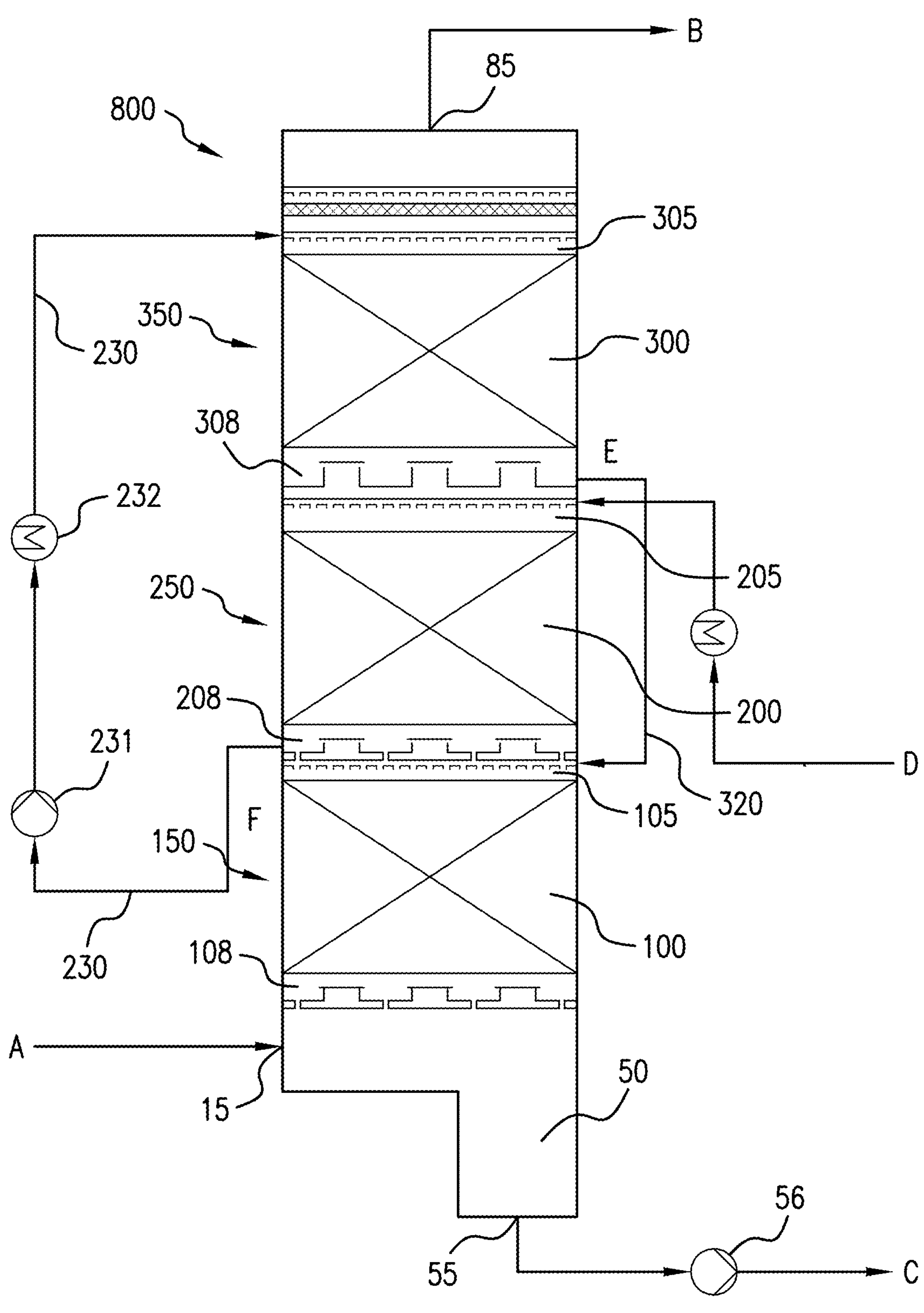
FIG. 1 is a simplified scheme illustrating an embodiment of a system and a process for removing $CO_2$ from a $CO_2$-containing gas stream.
Figure 2:
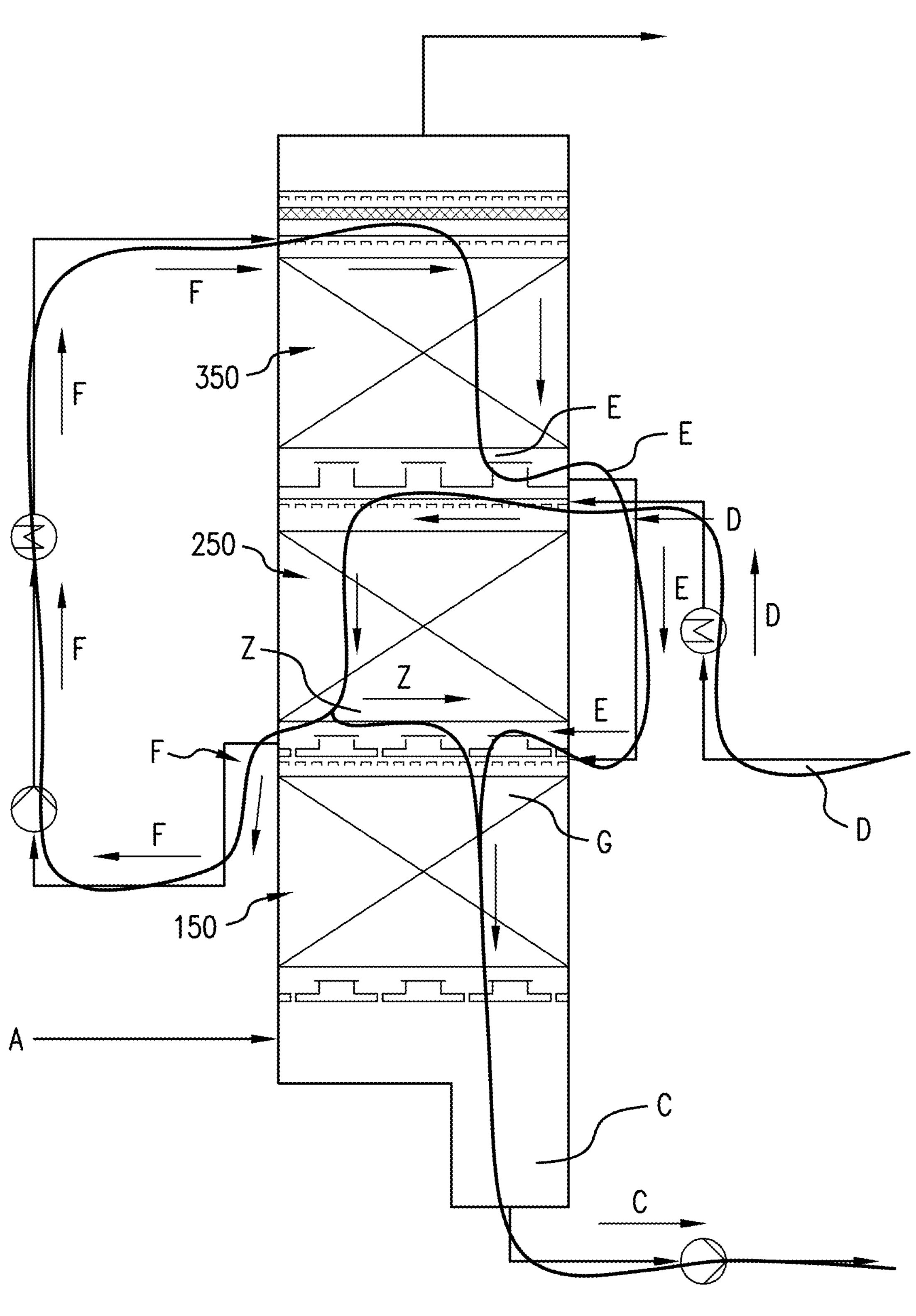
FIG. 2 is a simplified scheme illustrating the liquid mass flow (M) during a process of removing $CO_2$ from a $CO_2$-containing gas stream.

Referring to FIG. 1 and FIG. 2, an absorber vessel (800) is provided. The absorber vessel (800) is configured to receive a $CO_2$-containing gas stream (A) via an inlet (15)

located near the bottom of the vessel (800) and to allow the $CO_2$-containing gas stream (A) to flow upward and through the absorber vessel (800) to exit via an outlet (85) located near the top of the vessel (800) as a treated gas stream (B).

The $CO_2$-containing gas stream (A) entering the absorber vessel (800) can include air, natural gas, industrial effluents and commercial emissions. In an aspect, the $CO_2$-containing gas stream is a flue gas stream, which can be the gas produced when fossil fuels such as coal, oil, natural gas, or wood are burned for heat or power.

The absorber vessel (800) is configured to absorb $CO_2$ in the $CO_2$-containing gas stream (A), using an ammoniated aqueous solution. As used herein, an ammoniated aqueous solution refers to a solution that contains ammonium ions and water. Optionally the ammoniated aqueous solution also contains bicarbonate ions, carbonate ions, carbamate ions, potassium ions, dissolved alkanolamines (such as methyldiethanolamin), or a combination comprising at least one of the foregoing contents.

The absorber vessel (800) includes a first absorber stage (150), a second absorber stage (250), and a third absorber stage (350). When the absorber vessel is a column, the first, second, and third absorber stages (150, 250 and 350) can be located at the bottom, middle, and top sections of the absorber vessel (800) respectively.

Each absorber stage (150, 250, 350) can include at least one gas-liquid contacting device (100, 200 and 300), and a liquid distributor (105, 205 and 305) configured to distribute a solution into the gas-liquid contacting device. The second absorber stage (250) and the third absorber stage (350) can further include a liquid collector (208 and 308) for collecting a solution that has passed through the respective gas-liquid contacting device. The first absorber stage (150) can optionally have a liquid collector (108), but normally does not need to have one.

In each gas-liquid contacting device (150, 250, 350), an ammoniated aqueous solution contacts a $CO_2$-containing gas stream as the gas flows upwards through the absorber vessel (800) and the ammoniated solution travels downwards through the absorber vessel (800). Gas-liquid contacting devices (150, 250 and 350) can include, for example, structured or random packing materials.

Each liquid distributor (105, 205 and 305) can be located at the top of the respective absorber stage (150, 250 and 350) and is configured to introduce an ammoniated aqueous solution into the gas-liquid contacting devices (100, 200 and 300). The liquid distributors may be configured as, for example, spray head nozzles, conduits with perforations, and/or slots, or a combination thereof.

The liquid collectors (108, 208 and 308) may be arranged at the bottom of the respective absorber stages (150, 250, 350) to collect solutions that have passed through the respective gas-liquid contacting devices (100, 200 and 300). The liquid collectors (108, 208 and 308) can also be configured to allow the $CO_2$-containing gas stream rising up through the absorber vessel (800) to pass through or alongside the liquid collectors. The liquid collectors may for example comprise a chimney tray. Other suitable known liquid collectors designs can also be used. The liquid collectors can further have liquid outlets to remove the collected liquid. In some embodiments, the solution which has passed through the gas-liquid contacting device (100) of the first absorber stage (150) may be collected directly in a bottom portion of the absorber vessel (800) such as a tank (50). In such embodiments, no liquid collector may be needed for the first absorber stage (150).

Each of the absorber stages (150, 250 and 350) carries out a particular phase of the $CO_2$ absorption. In the process and system described herein, the second absorber stage (250) is configured to capture $CO_2$ in the $CO_2$-containing gas stream at lower $CO_2$ concentrations allowing a high level of overall $CO_2$ capture efficiency. For example, the second absorber stage (250) provides ample mass transfer driving force to efficiently capture the $CO_2$ passing the first absorber stage (150), allowing high overall capture efficiencies typically greater than 90% of the $CO_2$ in the $CO_2$-containing gas stream (A).

In the second absorber stage (250), a $CO_2$-lean solution (D) is introduced to the second liquid distributor (205). The $CO_2$-lean solution (D) can be produced from a $CO_2$ regenerator, and include water and ammonium ions, and optionally potassium ions, carbonate ions, bicarbonate ions, carbamate ions, potassium ions, dissolved alkanolamines (such as methyldiethanolamin), or a combination thereof. The $CO_2$-lean solution (D) from the regenerator is hot and needs to be cooled down before being introduced to the $CO_2$ absorber (800). Due to the composition of the $CO_2$-lean solution, $CO_2$ has a tendency to go into and be dissolved in the solution after moderate cooling. If the $CO_2$-lean solution is cooled down too much (or chilled to significantly below ambient temperature), slow liquid phase reactions helping otherwise to dissolve $CO_2$ can hinder the uptake of said $CO_2$, a moderate temperature may improve $CO_2$ consuming reaction kinetics in the liquid phase and increase the overall rates of $CO_2$ absorption or the rate of conversion of $CO_2$ in vapor to dissolved $CO_2$ in the form of ions such as carbamate, bicarbonate, and carbonate ions. The temperature of the $CO_2$-lean solution (D) entering the second absorber stage (250) is preferably high enough to avoid refrigeration, typically between 2° and 40° C., more preferably between 25 and 35° C., or about 30° C., depending on ambient conditions and solution composition.

Advantageously, in the process and system described herein, the $CO_2$-lean solution (D) is not mixed with any solution from the third absorber stage or the first absorber stage. Rather, the $CO_2$-lean solution (D) passes through the gas-liquid contacting device (200) once from top to bottom without mixing with other solutions to maximize the $CO_2$ absorption driving force. The configuration increases the potential for $CO_2$ removal, and/or reduces absorber system packing volume. Accordingly, the process and system disclosed herein use a once through liquid-side arrangement with a $CO_2$-lean liquid feed at moderate temperature to increase solvent reaction kinetics for $CO_2$ absorption.

The second liquid distributor (205) can distribute or spray the $CO_2$-lean solution (D) into the second gas-liquid contacting device (200), where the $CO_2$-lean solution (D) contacts the $CO_2$ gas stream rising through the contacting device (200) after entering from the first absorber stage (150), which gas stream is also referred to as partially cleaned gas stream. During the contacting, $CO_2$ in the partially clean gas stream dissolves further into the $CO_2$-lean solution (D) forming a $CO_2$-partially-enriched solution. The dissolution of $CO_2$ forms carbamate, carbonate and/or bicarbonate ions. The dissolution reaction is exothermic, and heat generated from the reaction increases solution temperature and may drive a portion of the ammonia dissolved in the $CO_2$-lean solution (D) into the gas phase. Accordingly, the gas stream exiting the second absorber stage (250) after contacting $CO_2$-lean solution, contains reduced $CO_2$ and increased ammonia concentrations (referred to as further cleaned gas stream containing ammonia). The further cleaned gas stream containing ammonia flows upwards from the second absorber stage (250) to the third absorber stage (350). After capturing $CO_2$ with a maximum possible concentration driving force, the $CO_2$-partially-enriched solution is collected for redistribution. Since going through the contacting device (200) increases the solution temperature, the collected $CO_2$-partially-enriched solution has a higher temperature than the $CO_2$-lean solution (D). The temperature of the $CO_2$-partially-enriched solution can have a temperature of about 25 to about 45° C., preferably about 30 to about 40° C., or about 35° C., depending on ambient conditions and solution composition.

The collected $CO_2$-partially-enriched solution is divided into a first portion (F) and a second portion (Z). The first portion (F) of the $CO_2$-partially-enriched solution is drawn from the second absorber stage (250) using a pump (231), cooled/chilled by a cooling/chilling device (232), and then introduced into the third absorber stage (350) to recover ammonia via a first liquid delivery path (230). Lowering the temperature of $CO_2$-partially-enriched solution (F) can increase the ability of the solution to absorb ammonia. In this way ammonia lost from the second absorber stage (250) can be recovered, and ammonia slip can be mitigated. Ammonia quickly absorbs in aqueous solutions at low temperature, more quickly than $CO_2$. Since the target of the third absorber stage (350) is to absorb ammonia, liquid temperature can be lowered considerably without hindering ammonia mitigation. However, care must be taken to avoid lowering the temperature in the cooling/chilling device (232) to the point where bicarbonate may precipitate in stream 230. The cooled/chilled $CO_2$-partially-enriched solution (F) entering the third absorber stage (350) can have a temperature of about 5 to about 20° C., preferably about 5 to about 15° C., or about 10° C., depending on solution composition.

Compared to extracting solutions from the first absorber stage (150) for ammonia mitigation where the $CO_2$ loading is the highest of all the absorber stages, extract solution for ammonia slip abatement from second absorber stage (250) allows the solution to be cooled without problems of ammonium bicarbonate precipitation. Accordingly, the process and system described herein reduce absorber ammonia slip and associated water wash requirements and stripper steam consumption of downstream processing equipment.

Preferably the cooled $CO_2$-partially-enriched solution (F) is sprayed or introduced into the third gas-liquid contacting device (300) via the third liquid distributor (308), where it contacts the further cleaned gas stream that contains ammonia generated from the second absorber stage (250), producing a treated gas (B) and a solution containing recovered ammonia (E). The treated gas (B) can exit the absorber vessel (800) via an outlet (85).

The solution with recovered ammonia (E) can be collected at the third liquid collector (308). Preferably the third absorber stage (350) is configured such that solution E does not flow into the second gas-liquid contacting device (200). In other words, the solution E does not mix with the $CO_2$-lean solution (D). One advantage is that the $CO_2$-lean solution is not diluted with a solution that is partially loaded with $CO_2$ to avoid reduction of the $CO_2$ capture driving force. Another advantage is that the lean solution temperature is not lowered by mixing with the solution used for recovering ammonia. Thus in the process and system described herein, the $CO_2$-lean solution (D) fed to the absorber (800) can maintain concentration driving force and maximize $CO_2$ capture potential at optimal feed temperatures for the second absorber stage (250).

The collected solution (E) is drawn from the third absorber stage (350), flows down a second fluid delivery path (320) for delivery to the gas-liquid contacting device (100) in the first absorber stage (150). The solution (E) exiting the third absorber stage (350) can have a temperature of about 10 to about 20° C. It is important that the relatively cool solution (E) is mixed with the second portion of the relatively warm $CO_2$-partially-enriched solution (Z) before passing into the first gas-liquid contacting device (100) in the first absorber stage.

The second absorber stage (250) typically has a height greater than 8 meters so that significant driving force is available to move the solution containing the recovered ammonia (E) from the bottom of the third absorber stage (350), for example the third liquid collector (308) to the top of the first absorber stage (150), for example to the first liquid distribution device (105) using gravity flow. The second absorber stage (250) may also have multiple gas-liquid contacting sections.

The solution containing the recovered ammonia (E) has a lower temperature than the second portion (Z) of the $CO_2$-semi-enriched solution. When the cool solution containing the recovered ammonia (E) is mixed with the warm $CO_2$-semi-enriched solution (Z), the warm $CO_2$-semi-enriched solution (Z) is cooled, forming a mixed solution (G) having a temperature that is lower than a temperature of the $CO_2$-semi-enriched solution (Z) thus achieving intercooling before the mixed solution (G) is introduced into the first gas-liquid contacting device (100) in the absorber stage (150). Accordingly, the $CO_2$ capture system can include a second liquid delivery path (320) for delivering a solution containing recovered ammonia drawn from the third absorber stage to the second liquid collector in the second absorber stage or to the first absorber stage at a height location that is above a first gas-liquid contacting device in the first absorber stage so that the cool solution containing the recovered ammonia and a second portion of the warm $CO_2$-partially-enriched solution are mixed above or in the first gas-liquid contacting device (100).

It is not critical how the mixing is conducted. The solution (E) and solution (Z) can be mixed in liquid collector (208) or in liquid distributor (105) before common distribution onto the first gas-liquid contacting device (100), or the solution (E) and solution (Z) can be distributed in parallel and allowed to mix above and in the first gas-liquid contacting device (100).

The process minimizes the disruption of the potential to capture $CO_2$ as what is taken out (solution F) is similar to what is brought back (solution E). Meanwhile, the process reduces packing volume allowing faster liquid bulk reaction rates without compromise of increased ammonia slip.

The mixed solution (G) (if the mixing is conducted in the second absorber stage) or the second portion of the $CO_2$-partially-enriched solution (if the mixing is conducted in the first absorber stage) is allowed to enter the first absorber stage (150), such as the liquid distributor (105) of the first absorber stage (150) using gravity flow. The function of the first absorber stage (150) is to achieve the maximum loading of the solution. In the first gas-liquid contacting device (100) of the first absorber stage (150), the mixed solution (G) contacts the $CO_2$-containing gas stream (A), generating a partially cleaned gas stream and a $CO_2$-enriched solution (C). The partially cleaned gas stream flows upwards into the second absorber stage (250). The $CO_2$-enriched solution (C) is collected at tank (50) before it is transferred out of the $CO_2$ absorber (800) via an outlet (55) using a pump (56).

Depending on the concentration of the $CO_2$ in the $CO_2$-containing gas (A), the first absorber stage (150) can have several gas-liquid contacting sections. Optionally, for high $CO_2$ concentrations the solution from the first absorber stage (150) can be taken out, cooled, and recycled back to the first absorber stage (150) to maximize the loading of the solution before regeneration.

Preferably, the disclosed process and system can avoid solution recirculation from the first absorber stage (150) to the second absorber stage (250), and/or avoid the solution recirculation from the first absorber stage (150) to the third absorber stage (350), yet still achieving improved $CO_2$ capture efficiency and/or reduced ammonia slip. Accordingly the disclosed process and system reduce the number of pumps required and associated power with improved $CO_2$ capture and/or improved ammonia slip mitigation performance.

The process and system disclosed herein use a once through liquid-side arrangement to increase operating temperature and increase solution reaction kinetics for $CO_2$ absorption, thus increasing the potential for $CO_2$ removal, and/or reduce absorber system packing volume. In addition, the process and system integrate ammonia slip abatement with solvent intercooling, thus improving solvent heat integration and reduce regeneration steam consumption. With the disclosed process and system, significant ammonia slip reduction is possible, in addition to a significant reduction in system cost, for a given $CO_2$ removal target.

Set forth below are some aspects of the foregoing disclosure:

Aspect 1. A process of removing $CO_2$ from a $CO_2$-containing gas stream, the process comprising: contacting, in a first absorber stage, a $CO_2$-containing gas stream with a solution mixture to generate a partially cleaned gas stream; contacting, in a second absorber stage, the partially cleaned gas stream with a $CO_2$-lean solution to generate a further cleaned gas stream that contains ammonia and a $CO_2$-partially-enriched solution; dividing the $CO_2$-partially-enriched solution into a first portion and a second portion; removing the first portion of the $CO_2$-partially-enriched solution from the second absorber stage; chilling the removed $CO_2$-partially-enriched solution; contacting, in the third absorber stage, the chilled $CO_2$-partially-enriched solution with the further cleaned gas stream that contains ammonia to generate a treated gas stream and a $CO_2$-partially-enriched-solution containing recovered ammonia; and combining the solution containing the recovered ammonia removed from the third absorber stage with the second portion of the $CO_2$-partially-enriched solution, forming the solution mixture used in the first absorber stage.

Aspect 2. The process as in any prior Aspect, wherein the $CO_2$-partially-enriched-solution containing the recovered ammonia does not mix with the $CO_2$-lean solution.

Aspect 3. The process as in any prior Aspect, wherein the $CO_2$-lean solution introduced into the second absorber stage is not mixed with any solution obtained from the first absorber stage or the third absorber stage.

Aspect 4. The process as in any prior Aspect, wherein the $CO_2$-lean solution introduced into the second absorber stage has a temperature of about 20 to about 35° C.

Aspect 5. The process as in any prior Aspect, wherein the $CO_2$-lean solution introduced into the second absorber stage comprises ammonium ions, water, and optionally potassium ions, carbonate ions, bicarbonate ions, carbamate ions, potassium ions, dissolved alkanolamines, or a combination thereof.

Aspect 6. The process as in any prior Aspect, wherein the $CO_2$-partially-enriched-solution containing the recovered ammonia is combined and mixed with the second portion of the $CO_2$-partially-enriched solution exiting the second absorber stage forming the solution mixture which has a reduced temperature as compared to that of the second portion of the $CO_2$-partially-enriched solution before the solution mixture is introduced into the first absorber stage.

Aspect 7. The process as in any prior Aspect, wherein the combination and mixing to produce the solution mixture is accomplished and subsequently introduced into the first absorber stage via gravity.

Aspect 8. The process as in any prior Aspect, wherein the chilled $CO_2$-partially-enriched solution has a temperature of about 5 to about 15° C.

Aspect 9. The process as in any prior Aspect, wherein the $CO_2$-partially-enriched-solution containing the recovered ammonia exiting the third absorber stage has a temperature of about 10 to about 20° C.

Aspect 10. The process as in any prior Aspect, further comprising cooling the second portion of the $CO_2$-partially-enriched solution by mixing with the $CO_2$-partially-enriched-solution containing the recovered ammonia.

Aspect 11. The process as in any prior Aspect, wherein the process does not include recirculation of a solution from the first absorber stage to the second absorber stage.

Aspect 12. The process as in any prior Aspect, wherein the process does not include recirculation of a solution from the first absorber stage to the third absorber stage.

Aspect 13. A $CO_2$ capture system comprising: an absorber vessel comprising a first absorber stage, a second absorber stage, and a third absorber stage, the second absorber stage comprising a second gas-liquid contacting device and a second liquid collector for collecting a $CO_2$-partially-enriched solution which is a lean solution that has passed through the second gas-liquid contacting device; a gas inlet for introducing a $CO_2$-containing gas stream into the absorber vessel; a gas outlet for removing a treated gas stream from the absorber vessel; a liquid inlet for introducing the $CO_2$-lean solution into the second absorber stage; a liquid outlet for removing a $CO_2$-rich solution from the first absorber stage; a first liquid delivery path for delivering an ammonia mitigation solution, which is a first portion of the $CO_2$-partially-enriched solution collected on the second liquid collector that is above a first liquid distributor in the first absorber stage, to the third absorber stage; a chilling means for reducing the ammonia mitigation solution temperature before the ammonia mitigation solution is delivered to the third absorber stage; and a second liquid delivery path for delivering a solution containing recovered ammonia drawn from the third absorber stage to the second liquid collector in the second absorber stage or to the first absorber stage at a height location that is above a first gas-liquid contacting device in the first absorber stage so that the solution containing the recovered ammonia and a second portion of the $CO_2$-partially-enriched solution are mixed above or in the first gas-liquid contacting device.

Aspect 14. The $CO_2$ capture system as in any prior Aspect, wherein the third absorber stage comprises a third liquid distributor, a third gas-liquid contacting device, and a third liquid collector, and the first liquid delivery path is configured to deliver the chilled ammonia mitigation solution to the third liquid distributor.

Aspect 15. The $CO_2$ capture system as in any prior Aspect, wherein the third liquid collector is configured such that the solution with the recovered ammonia collected on the third liquid collector does not flow into the second absorber stage to mix with the $CO_2$-lean solution.

Aspect 16. The $CO_2$ capture system as in any prior Aspect, wherein the second liquid delivery path is configured to deliver the solution containing the recovered ammonia collected at the third liquid collector in the third absorber stage to the second liquid collector in the second absorber stage so that the solution containing the recovered ammonia mixes with the second portion of the $CO_2$-partially-enriched solution to form a mixed solution before the mixed solution is distributed to the first gas-liquid contacting device in the first absorber stage.

Aspect 17. The $CO_2$ capture system as in any prior Aspect, wherein the second liquid delivery path is configured to deliver the solution containing the recovered ammonia collected at the third liquid collector in the third absorber stage to the first liquid distributor in the first absorber stage so that the solution containing the recovered ammonia mixes with the second portion of the $CO_2$-partially-enriched solution distributed to the first liquid distributor to form a mixed solution before the mixed solution is distributed into the first gas-liquid contacting device.

Aspect 18. The $CO_2$ capture system as in any prior Aspect, wherein the second liquid distributor in the second absorber stage is configured to receive the $CO_2$-lean solution and distributes the $CO_2$-lean solution into the second gas-liquid contacting device.

Aspect 19. The $CO_2$ capture system as in any prior Aspect, wherein the system does not include a fluid delivery path to deliver a solution from the first absorber stage to the second absorber stage.

Aspect 20. The $CO_2$ capture system as in any prior Aspect, wherein the system does not include a fluid delivery path to deliver a solution from the first absorber stage to the third absorber stage.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of +8% or 5%, or 2% of a given value.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A process of removing $CO_2$ from a $CO_2$-containing gas stream, the process comprising: contacting, in a first absorber stage, a $CO_2$-containing gas stream with a solution mixture to generate a partially cleaned gas stream; contacting, in a second absorber stage, the partially cleaned gas stream with a $CO_2$-lean solution to generate a further cleaned gas stream that contains ammonia and a $CO_2$-partially-enriched solution; dividing the $CO_2$-partially-enriched solution into a first portion and a second portion; removing the first portion of the $CO_2$-partially-enriched solution from the second absorber stage; chilling the removed $CO_2$-partially-enriched solution; contacting, in a third absorber stage, the chilled $CO_2$-partially-enriched solution with the further cleaned gas stream that contains ammonia to generate a treated gas stream and a $CO_2$-partially-enriched-solution containing recovered ammonia; and combining the solution containing the recovered ammonia removed from the third absorber stage with the second portion of the $CO_2$-partially-enriched solution before distribution to a first gas-liquid contacting device to form a mixed solution at a reduced temperature, thereby avoiding a separate intercooling equipment, forming the solution mixture used in the first absorber stage, wherein the combining comprises delivering the solution containing the recovered ammonia drawn from the third absorber stage to a second liquid collector in the second absorber stage or to the first absorber stage at a height location that is above the first gas-liquid contacting device in the first absorber stage to allow the solution containing the recovered ammonia and the second portion of the $CO_2$-partially-enriched solution to be mixed above or in the first gas-liquid contacting device.

2. The process of claim 1, wherein the $CO_2$-partially-enriched-solution containing the recovered ammonia does not mix with the $CO_2$-lean solution.

3. The process of claim 1, wherein the $CO_2$-lean solution introduced into the second absorber stage is not mixed with any solution obtained from the first absorber stage or the third absorber stage.

4. The process of claim 1, wherein the $CO_2$-lean solution introduced into the second absorber stage has a temperature of about 20 to about 35° C.

5. The process of claim 1, wherein the $CO_2$-lean solution introduced into the second absorber stage comprises ammonium ions, water, and optionally potassium ions, carbonate ions, bicarbonate ions, carbamate ions, potassium ions, dissolved alkanolamines, or a combination thereof.

6. The process of claim 1, wherein the $CO_2$-partially-enriched-solution containing the recovered ammonia is combined and mixed with the second portion of the $CO_2$-partially-enriched solution exiting the second absorber stage forming the solution mixture which has a reduced temperature as compared to that of the second portion of the $CO_2$-partially-enriched solution before the solution mixture is introduced into the first absorber stage.

7. The process of claim 6, wherein the combination and mixing to produce the solution mixture is accomplished and subsequently introduced into the first absorber stage via gravity.

8. The process of claim 1, wherein the chilled $CO_2$-partially-enriched solution has a temperature of about 5 to about 15° C.

9. The process of claim 1, wherein the $CO_2$-partially-enriched-solution containing the recovered ammonia exiting the third absorber stage has a temperature of about 10 to about 20° C.

10. The process of claim 1, further comprising cooling the second portion of the $CO_2$-partially-enriched solution by mixing with the $CO_2$-partially-enriched-solution containing the recovered ammonia.

11. The process of claim 1, wherein the process does not include recirculation of a solution from the first absorber stage to the second absorber stage.

12. The process of claim 1, wherein the process does not include recirculation of a solution from the first absorber stage to the third absorber stage.

13. A $CO_2$ capture system comprising:

an absorber vessel comprising a first absorber stage, a second absorber stage, and a third absorber stage, the second absorber stage comprising a second gas-liquid contacting device and a second liquid collector for collecting a $CO_2$-partially-enriched solution which is a lean solution that has passed through the second gas-liquid contacting device;

a gas inlet for introducing a $CO_2$-containing gas stream into the absorber vessel;

a gas outlet for removing a treated gas stream from the absorber vessel;

a liquid inlet for introducing the $CO_2$-lean solution into the second absorber stage;

a liquid outlet for removing a $CO_2$-rich solution from the first absorber stage;

a first liquid delivery path for delivering an ammonia mitigation solution, which is a first portion of the $CO_2$-partially-enriched solution collected on the second liquid collector that is above a first liquid distributor in the first absorber stage, to the third absorber stage;

a chilling means for reducing the ammonia mitigation solution temperature before the ammonia mitigation solution is delivered to the third absorber stage; and a second liquid delivery path for delivering a solution containing recovered ammonia drawn from the third absorber stage to the second liquid collector in the second absorber stage or to the first absorber stage at a height location that is above a first gas-liquid contacting device in the first absorber stage to allow the solution containing the recovered ammonia and a second portion of the $CO_2$-partially-enriched solution to be mixed above or in the first gas-liquid contacting device.

14. The $CO_2$ capture system of claim 13, wherein the third absorber stage comprises a third liquid distributor, a third gas-liquid contacting device, and a third liquid collector, and the first liquid delivery path is configured to deliver the chilled ammonia mitigation solution to the third liquid distributor.

15. The $CO_2$ capture system of claim 13, wherein the third liquid collector is configured such that the solution with the recovered ammonia collected on the third liquid collector does not flow into the second absorber stage to mix with the $CO_2$-lean solution.

16. The $CO_2$ capture system of claim 13, wherein the second liquid delivery path is configured to deliver the solution containing the recovered ammonia collected at the third liquid collector in the third absorber stage to the second liquid collector in the second absorber stage so that the solution containing the recovered ammonia mixes with the second portion of the $CO_2$-partially-enriched solution to form a mixed solution before the mixed solution is distributed into the first gas-liquid contacting device in the first absorber stage.

17. The $CO_2$ capture system of claim 13, wherein the second liquid delivery path is configured to deliver the solution containing the recovered ammonia collected at the third liquid collector in the third absorber stage to the first liquid distributor in the first absorber stage so that the solution containing the recovered ammonia mixes with the second portion of the $CO_2$-partially-enriched solution distributed to the first liquid distributor to form a mixed solution before the mixed solution is distributed into the first gas-liquid contacting device.

18. The $CO_2$ capture system of claim 13, wherein the second liquid distributor in the second absorber stage is configured to receive the $CO_2$-lean solution and distributes the $CO_2$-lean solution into the second gas-liquid contacting device.

19. The $CO_2$ capture system of claim 13, wherein the system does not include a fluid delivery path to deliver a solution from the first absorber stage to the second absorber stage.

20. The $CO_2$ capture system of claim 13, wherein the system does not include a fluid delivery path to deliver a solution from the first absorber stage to the third absorber stage.

* * * * *